S. G. Cabell.
Steam-Engine Piston.
Nº 56,898. Patented Aug. 7. 1866.
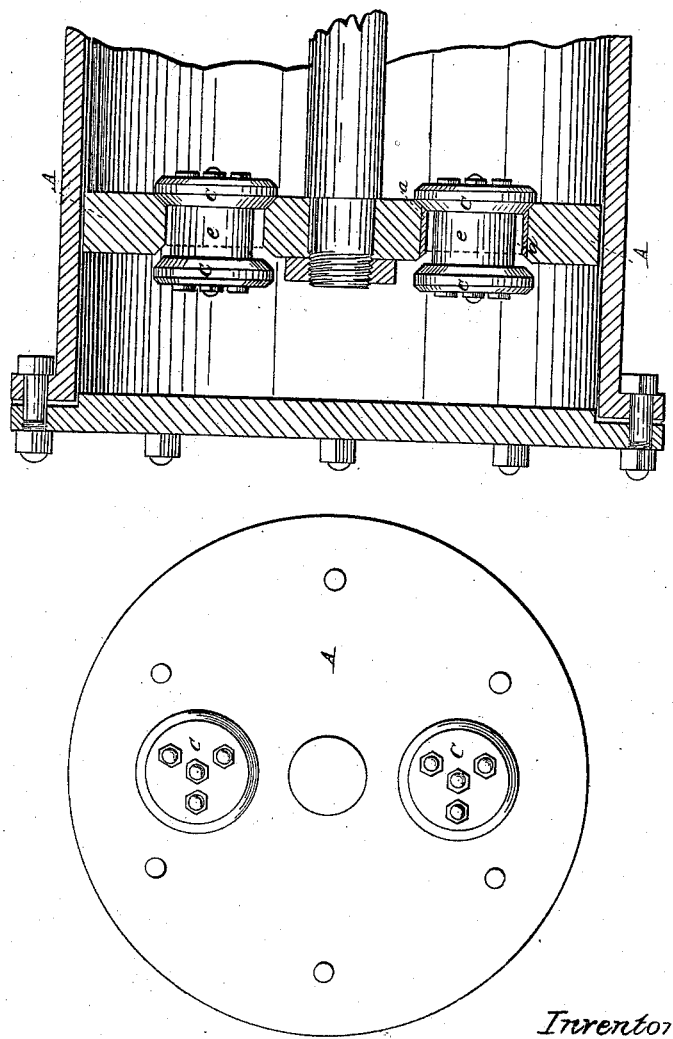
Witnesses:
Inventor:
Samuel G Cabell

UNITED STATES PATENT OFFICE.

SAMUEL G. CABELL, OF QUINCY, ILLINOIS.

IMPROVED METHOD OF OPERATING STEAM-ENGINES.

Specification forming part of Letters Patent No. 56,898, dated August 7, 1866.

*To all whom it may concern:*

Be it known that I, S. G. CABELL, of Quincy, in Adams county and State of Illinois, have invented a new and useful Improvement in Pistons for Steam-Engines; and I do hereby declare that the following is a full, clear, and exact description thereof, reference being had to the accompanying drawings, through letters of reference marked thereon, forming part of this specification, in which—

Figure 1 represents a plan of a steam-piston embracing my improvement, and Fig. 2 a transverse section of the same.

The same letters occurring on both figures indicate corresponding parts.

This invention consists in providing for the use of a portion of the spent steam in the cylinder to fill the vacuum on the opposite side of the piston and in the side pipes, for which purpose I use a double-seated valve or valves in the piston of a steam-engine, by the operation of which a portion of the propelling-steam is caused to exhaust through the piston at each end of the cylinder, thus supplying the space of the vacuum on the exhaust side of the piston and side pipes with the spent steam from the other side before the admission of fresh steam from the boiler. This may be accomplished in various ways: either by an additional passage through the D or slide valve, forming a double D, or, in a side pipe puppet-valve engine, by the addition of a supplementary exhaust-valve. It may also be accomplished by providing side passages in the cylinder, extending slightly more than the thickness of the piston at each end of the cylinder, all of which would be considered equivalents of my present described arrangement, and thus economizing about twelve per cent. in the consumption of steam and fuel.

To enable others skilled in the art to understand the construction and operation of my invention, I will proceed to describe it with reference to the drawings.

A represents a steam-piston, which may be constructed in any ordinary manner; but I prefer the solid piston-head with curved or corrugated plate-packing, as fully described in a previous application for Letters Patent filed by me May 19, 1866. In this piston I insert one or more winged double puppet-valves, C, or valves of any suitable construction having a seat and forming a steam-tight valve, at each side of the piston. These two valves are rigidly connected together by means of bolts passing through them and the winged shank between them. The shank $e$ is of such length that when the valve is closed on one side of the piston it is open on the other side, and vice versa.

My improvement may be adapted to old pistons of any construction by inserting a sleeve, $a$, passing through the several parts, as represented in Fig. 2, and when applied to the piston of a vertical engine the valve should be sustained by a spiral spring around the shank of just sufficient strength to sustain its weight.

The central bolt connecting the two valves together and passing through the shank $e$, or all of them, are adjusted to such a length that when the piston has nearly reached the end of its travel in the cylinder, and before the admission of steam to give it return motion, said bolt or bolts, or other projection provided for that purpose, shall come in contact with the cylinder-head, which, by the continued travel of the piston, opens the valve and allows the steam in the cylinder to exhaust through the piston, and fill the vacuum on the other side and in the side pipes previous to the admission of fresh steam from the boiler, which, being admitted, immediately closes the valve on the opposite side and renders the piston steam-tight for its reverse travel. The operation being the same at each end of the cylinder, considerable saving is effected in the consumption of fuel, amounting, as shown by experiment, to about twelve per cent. in the best-constructed engines and more in others.

It will be obvious that various modifications may be made in the style and construction of the valves. I therefore do not limit myself to the puppet-valve.

Having thus described my invention, what I claim as new, and desire to secure by Letters Patent, is—

1. Providing for the use of a portion of the spent steam in the cylinder to fill the vacuum on the opposite side of the piston previously to the admission of fresh steam for its return motion, by means substantially as herein specified.

2. The arrangement of a valve or valves in the piston of a steam-engine, substantially as and for the purpose set forth.

SAMUEL G. CABELL.

Witnesses:
N. H. VANZANDT,
W. MORRIS SMITH.